United States Patent
Galifi

(10) Patent No.: US 9,908,069 B2
(45) Date of Patent: Mar. 6, 2018

(54) METHOD OF MANUFACTURING A FILTER ELEMENT AND FILTER ELEMENT

(71) Applicant: Hydac Filtertechnik GmbH, Sulzbach/Saar (DE)

(72) Inventor: Giuseppe Galifi, St. Ingbert (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 456 days.

(21) Appl. No.: 14/562,891

(22) Filed: Dec. 8, 2014

(65) Prior Publication Data
US 2015/0157970 A1    Jun. 11, 2015

(30) Foreign Application Priority Data

Dec. 11, 2013 (DE) .......... 10 2013 020 752

(51) Int. Cl.
| | | |
|---|---|---|
| *B01D 46/00* | (2006.01) | |
| *B01D 29/11* | (2006.01) | |
| *B01D 29/13* | (2006.01) | |
| *B01D 46/52* | (2006.01) | |
| *B32B 37/06* | (2006.01) | |
| *B32B 38/00* | (2006.01) | |
| *B01D 46/24* | (2006.01) | |
| *B01D 29/21* | (2006.01) | |
| *B01D 29/58* | (2006.01) | |

(52) U.S. Cl.
CPC ........ *B01D 46/0001* (2013.01); *B01D 29/111* (2013.01); *B01D 29/13* (2013.01); *B01D 29/21* (2013.01); *B01D 29/58* (2013.01); *B01D 46/2403* (2013.01); *B01D 46/521* (2013.01); *B01D 46/523* (2013.01); *B32B 37/06* (2013.01); *B32B 38/0008* (2013.01); *B01D 2201/127* (2013.01); *B32B 2597/00* (2013.01); *Y10T 156/10* (2015.01)

(58) Field of Classification Search
CPC ............ B01D 46/0001; B01D 46/2403; B01D 46/521; B01D 46/523; B01D 29/111; B01D 29/13; B01D 29/21; B01D 29/58; B32B 37/06; B32B 37/0008
See application file for complete search history.

(56) References Cited

U.S. PATENT DOCUMENTS

| | | | | |
|---|---|---|---|---|
| 2005/0100703 A1* | 5/2005 | Terada | ................. | B29C 65/1635 428/57 |
| 2006/0005517 A1* | 1/2006 | Sundet | ............... | B01D 46/0001 55/497 |
| 2008/0276584 A1* | 11/2008 | Driesen | ................. | B01D 29/111 55/502 |

(Continued)

FOREIGN PATENT DOCUMENTS

| | | | |
|---|---|---|---|
| DE | 10 2011 122 348 A1 | 6/2013 | |
| JP | 08175576 A | * | 7/1996 |

*Primary Examiner* — Daniel McNally
(74) *Attorney, Agent, or Firm* — Wenderoth, Lind & Ponack, L.L.P.

(57) ABSTRACT

A method produces a filter element (1) having a filter mat (5) enclosed by at least one fluid-permeable outer envelope (13). By an energy input method, at least one part of the filter mat (5), which faces toward the outer envelope (13), is connected to the outer envelope in at least one connecting zone (17). A filter element is produced by this method.

13 Claims, 5 Drawing Sheets

(56) References Cited

U.S. PATENT DOCUMENTS

| 2010/0084334 | A1* | 4/2010 | Galifi | B29C 66/712 |
| | | | | 210/497.01 |
| 2012/0213926 | A1* | 8/2012 | Lauer | B01D 29/111 |
| | | | | 427/244 |
| 2013/0015121 | A1* | 1/2013 | Mees | B01D 29/111 |
| | | | | 210/497.01 |

* cited by examiner

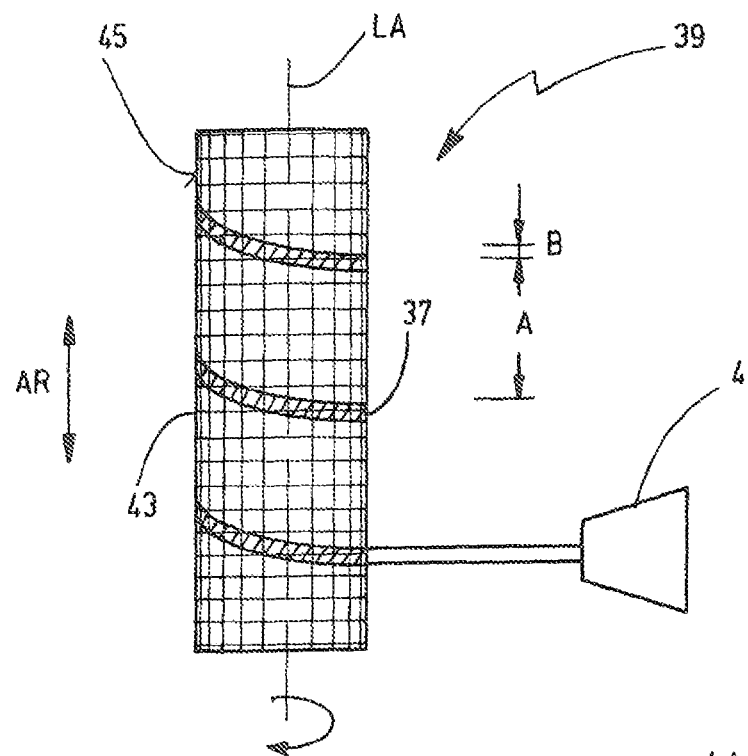
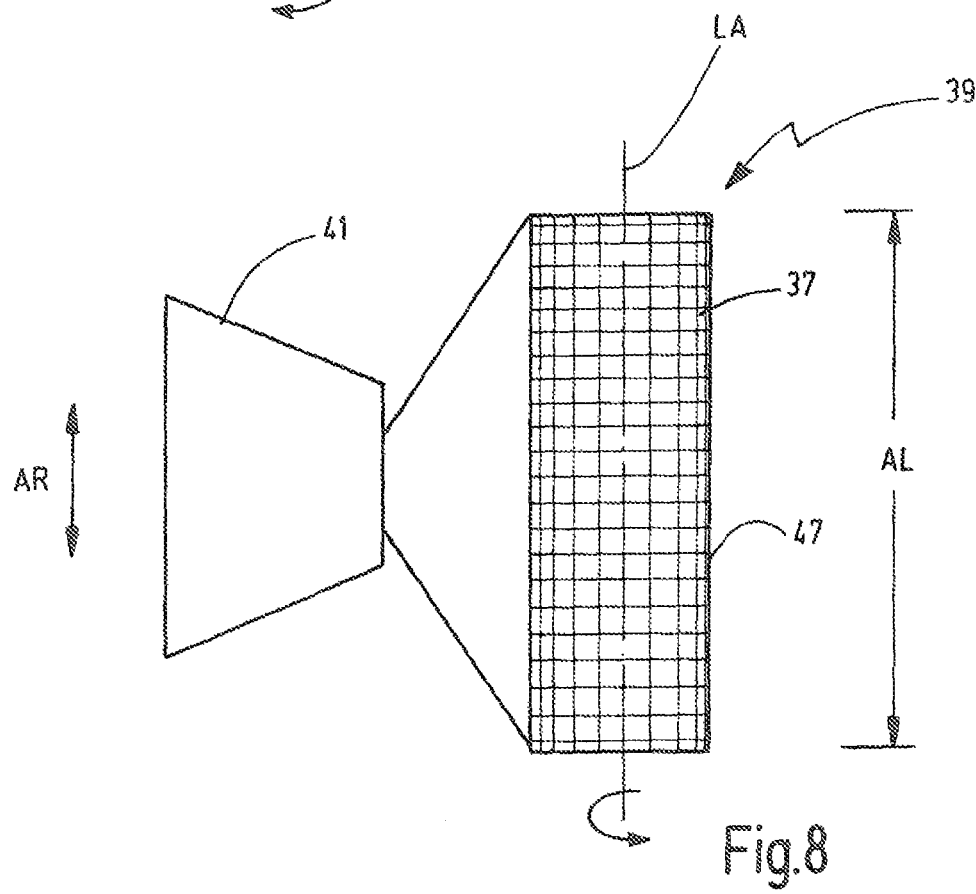

METHOD OF MANUFACTURING A FILTER ELEMENT AND FILTER ELEMENT

FIELD OF THE INVENTION

The invention relates to a method for producing a filter element having a filter mat, which is enclosed by at least one fluid-permeable outer envelope. The invention also relates to a filter element, in particular produced according to that method.

BACKGROUND OF THE INVENTION

Filter elements having a preferably folded, and thus pleated filter medium, are used in systems and facilities, in which fluids are used as operating media, to ensure the proper condition of the particular fluids. The fluids in question can be, for example, lubricating oils, fuels, and hydraulic liquids, process water, and air flows, which are subject to contaminants, or which contain contaminants present as colloids or as solid particles. In particular, in the case of higher-value facilities, for safety reasons and for economic reasons the filter elements in use need to deliver full efficiency beyond the provided usage times. Malfunctions of the filter elements would cause operational disruptions, even system failures, which can result in economic damage.

During the operation of filter elements having star-folded filter media, one possible cause of a reduced filter function can be seen in that during the flow through the folded structure of the filter medium, the folded structure is subjected to local stresses. Due to local stresses, local blockage formations of the folds can occur, whereby isolated areas of the filter surface come into direct contact with one another. At these regions, no through flow or only a slight through flow then takes place in relation to the unblocked filter folds. The reduced flow is accompanied by a correspondingly reduced dirt absorption.

One proposed solution to remedy this error source, which is disclosed in DE 10 2004 054 245 A1, provides stabilization in the form of band-shaped surface elements in a filter element of the aforementioned type. The surface elements are laid as a closed ring around the outer side of the pleated filter medium. Connecting points or connecting zones to the adjoining fold backs of the filter medium are fixed on the inner sides of the bands. The connecting points are each formed by spot welds, at which the materials of the outer layer of the filter medium and of the adjoining band on its inner side are fixedly fused with one another by an energy input method, for example, in the form of an ultrasound or laser welding method.

EP 2 559 467 A1 criticized that prior art since the large number of pleated folds requires carrying out a plurality of welding operations, making the production more complicated and costly. Furthermore, the freedom of the material selection is restricted insofar as a material pair must be selected for the band-shaped surface elements and the outer layer of the filter medium, which is compatible for an ultrasound or laser welding operation to be carried out directly thereon.

To counter these disadvantages, the solution according to EP 2 559 467 A1 proposes connection in the form of an adhesive application. In cooperation with the fold backs of the filter medium facing toward the respective support jacket, the adhesive forms connecting zones. The connecting zones are distributed in such a way that all circumferential fold backs, which face toward the respective protective jacket, are located inside at least one connecting zone. Anchoring points are then formed for all fold backs on the facing support jacket, which effectively stabilizes the fold geometry against acting flow forces. The adhesive application is provided on the support jacket or on the filter medium itself. Adhesive applications in the form of strip-shaped adhesive beads or adhesive clusters are preferably used.

In these prior art solutions, no fluid passage point is provided in the region of the adhesive application points or in the region of the welded-on closed fixing bands, which would enable fluid to flow through the filter element in this respective region. In this regard, the filtration performance is also impaired in these known solutions because of the fluid impermeability of the support for the fold fixation.

SUMMARY OF THE INVENTION

An object of the invention is to provide an improved filter element, which may be simply and efficiently produced, but nonetheless ensures proper stabilization of the fold geometry and, additionally, ensures a high filtration performance.

This object is basically achieved by a method and a filter element having, by an energy input method, at least one part of a filter mat, which faces toward an outer envelope, being connected thereto in at least one connecting zone, wherein the outer envelope in this regard is designed to be fluid-permeable, preferably perforated throughout.

A contact situation does also occur here at the points of the respective contact between the inner circumferential side of the outer envelope and the outer region of the filter mat, regularly in the form of a support lattice layer acting as a drainage layer. The flow through the fluid-permeable outer envelope is impaired or completely non-existent at the contact points. However, the regions in this regard recede from the total area of possible connecting zones as compared to the total number of possible fluid passages in the outer envelope, such that in this regard no noticeable or noteworthy impairment of the filtration performance using the filter element is observable.

An outer lateral surface, which supports the filter mat material toward the outside, is then available, which, perforated preferably throughout, forms a plurality of fluid passage points for the subsequent filtration using the filter mat. The fluid-permeable outer envelope in this case fixes, via its connecting zones, not only the individual filter folds in the filter mat, so that they no longer result in blockage due to unintentional contact against one another, but rather also enable homogeneous through flow via the perforation of the outer envelope in a uniform manner through the filter element material. A resistance-free filter operation is then ensured, which also contributes to an increase in filtration performance using the filter element.

Depending on the respective selected energy input method, the filter mat, formed preferably of relevant known plastic materials, and the outer envelope may expand due to the thermal input, thereby producing a friction lock or force lock between filter mat and outer envelope in the region of the respective connecting zone. A secure fold fixation is then achieved in the event of full flow through the filter element formed of filter mat and outer envelope. If fusion of the plastic materials adjacent to one another occurs in the region of the respective connecting zone from the energy side due to the input, in this manner a defined welded bond can be implemented at these points or, a form-fitted connection can also be implemented if the fusing operation taking place in the region of the respective connecting zone outside the contact of inner side of the outer envelope and associated fold backs of the filter element material is controlled. In that case, the respective filter fold is then held between two welding operations in the region of the connecting zone along the inner side of the fluid-permeable outer envelope.

Therefore, form-fitted and friction-locked and also integrally-joined connections can be achieved using the energy input method according to the invention, depending on the design for fixing the filter folds on the outer envelope of the filter element. Such possibilities can be used in combination with one another, with respect to one filter element.

Preferably infrared and laser beam welding methods are used as the energy input method. A laser transmission welding method is particularly preferably used, which enables a plurality of connecting zones to be produced between outer envelope and filter element material in a particularly efficient manner.

Preferably, the outer envelope is provided with a layer, in particular in the form of a film web, which enables an unconstrained irradiation with laser light when facing toward the laser light source, with little absorption of the laser light. Only a slight release of thermal energy in this outer layer is then enabled. By forming an additional laser-opaque and/or laser-absorbent, subsequent layer, formed preferably as an additional film web, between the laser-transmissive or laser-permeable outer layer of the envelope and the outer region of the pleated filter element thus facing toward it, energy absorption takes place during the laser energy input in the region of the barrier layer thus formed, with corresponding fusion. The material region thus heated and fused by the laser light forms, in the connecting zones, the joint element for connecting the adjacent joint partner, and is therefore used for connecting the outer envelope to the pleated filter material.

The laser-opaque or laser-absorbent barrier layer as one of the layers of the outer envelope can be obtained within the scope of a multi-film web extrusion method or can be spread on or applied in another manner, for example, by gluing, to an already existing laser-transmissive or laser-permeable film web.

The laser-absorbent or laser-opaque barrier layer is particularly preferably formed by spraying an aqueous, ink-like solution onto the laser transmissive film web. The ink-like solution then dries directly on the film web and adheres as a preferably nanoparticulate component to this transmissive film web. Furthermore, the possibility exists of providing the laser-absorbent barrier layer with carbon black or graphite particles also in the nanoparticulate region, in order in this manner to capture the laser light for the heat emission.

If plastic films are used, the laser-absorbent film, which in this regard forms a type of welding film, can be formed from a plastic material such that it is radiation-opaque in a wavelength range of 150 to 2500 nm, preferably 500 to 1500 nm, i.e., it absorbs infrared light or laser light. Given the possibility of the volume increase, a film thickness (absorbent layer) regularly between approximately 0.03 to 0.3 mm, preferably approximately 0.1 mm, should be used for obtaining a good welding result. In this case, it can preferably be a polyamide film having the mentioned embedded laser-sensitive or infrared-sensitive particles. In addition to carbon black or graphite, other colored pigments, for example, the colorant blue or indigo, can be used. The particles should have a corresponding minimum temperature stability, in order in this way to achieve a visually clean outer envelope design for the filter element. In contrast, the laser transparent film web used may preferably be one made of a polyethylene plastic material.

The barrier layer, formed at least partially of material that is opaque or absorbent to laser light, can have components that are at least partially electrically conductive. The electrical conductivity in this regard may be achieved in that additives in the form of carbon nanotubes and/or carbon fibers and/or electrically conductive metal fibers, such as steel or copper fibers, are also added to the barrier layer. Suitable lasers for the mentioned transmission welding method by laser light are, for example, solid-state lasers, such as Nd:YAG lasers having a wavelength of 1064 nm and high-powered diode lasers having wavelengths in the range of 800 to 1000 nm. Laser energy input methods, in which the laser light may be focused in a targeted manner within a laser transmissive plastic film for a heating operation, are particularly preferably used. In this way, laser-impermeable or laser-absorbent layers can then be omitted.

By a relative movement between the laser beams used and the outer envelope of the filter element, a variety of path shapes may be achieved. The path shapes contain the connecting zones and in this manner ensure the fixation of the filter folds on the outer envelope. In this case, in addition to longitudinal paths along the axial alignment of the filter fold backs, transverse paths, whether circular or spiral in shape, are also used as movement paths, in this manner to produce the connecting zones over the longitudinal alignment of the filter element. Every filter fold is not necessarily to be connected via a connecting zone to the inner side of the outer envelope. With regard to the connecting zones and the respective size dimensions thereof, technical boundary values for the filter element should be ensured, such as pressure stability, filtration performance, duration of use, alternating strain, pressure surge sensitivity, etc.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIGS. 6 to 8 are side views schematically illustrating method sequences for producing connections between a filter mat and an outer envelope using a laser device as the energy input according to first, second and third exemplary embodiments, respectively, of the invention.

DETAILED DESCRIPTION OF THE INVENTION

Figure 1:
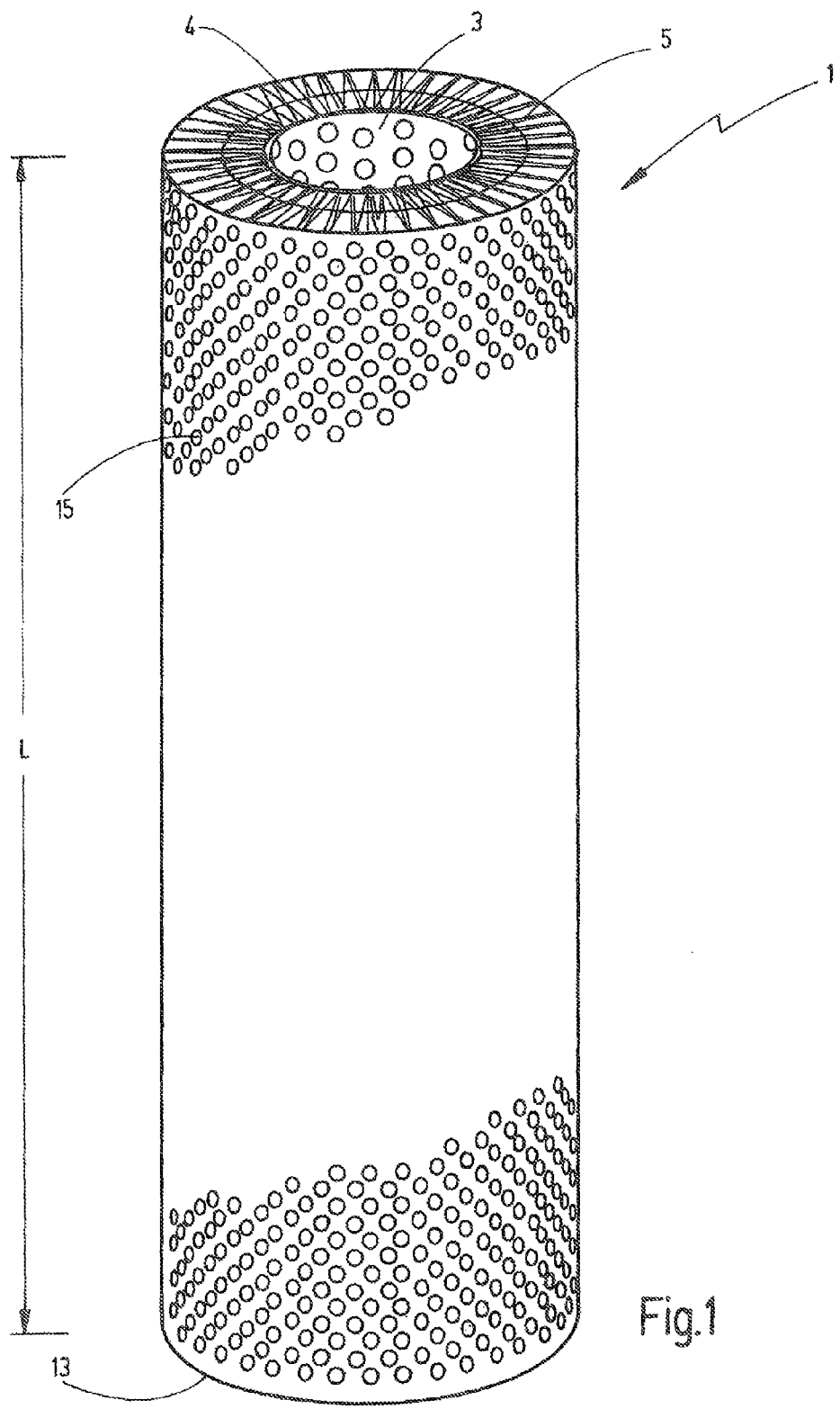
FIG. 1 is a perspective view of a filter element part producible by a method according to the invention.
Figure 2:
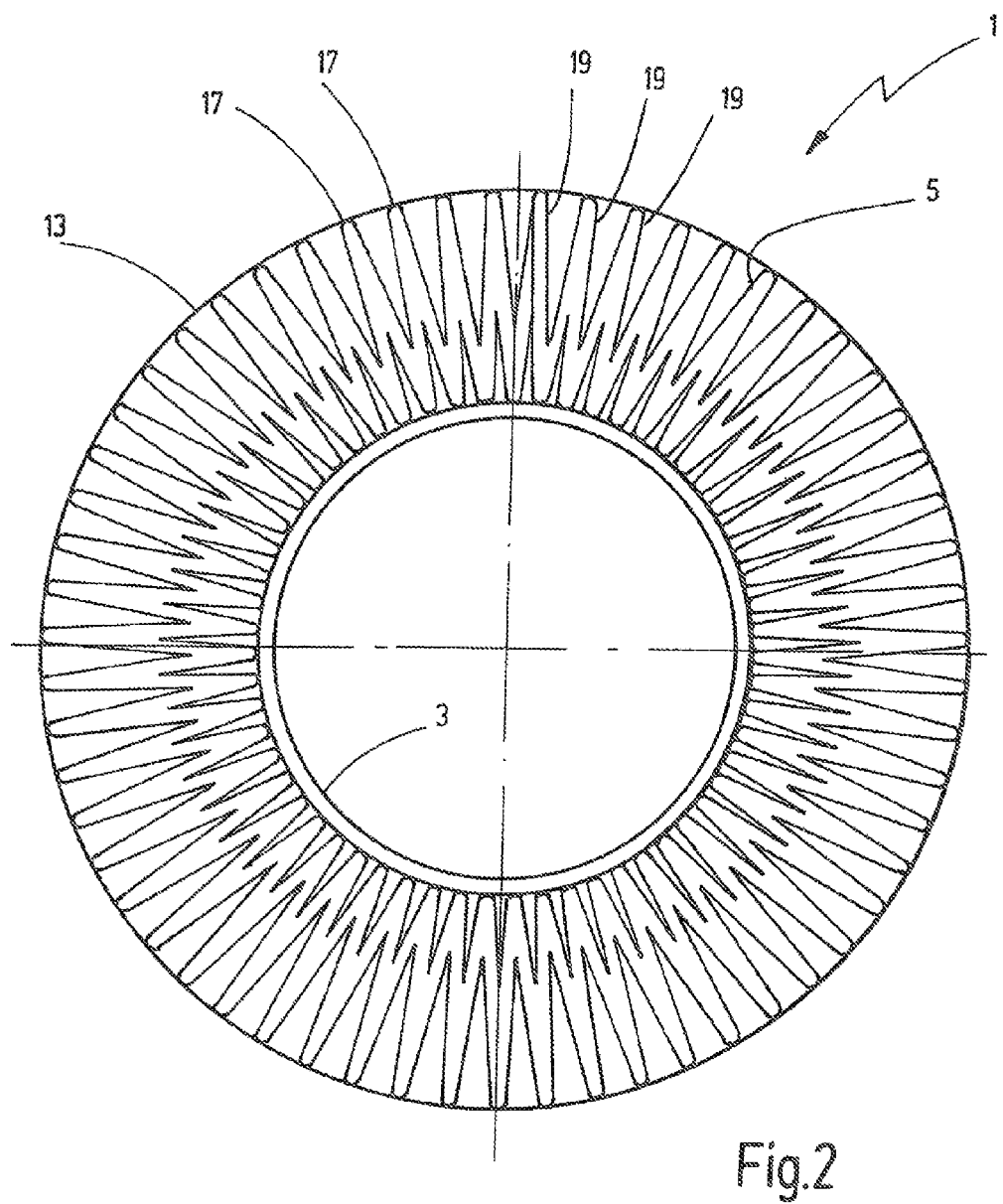
FIG. 2 is a top view of the filter element part of FIG. 1.
Figure 3:
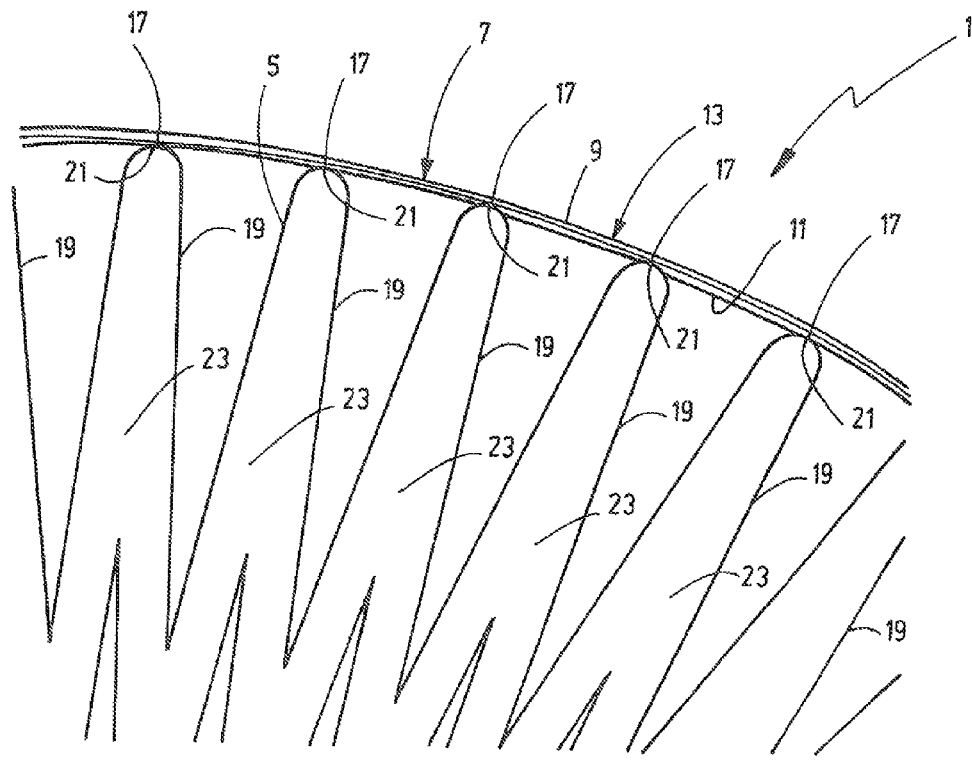
FIGS. 3 to 5 are enlarged partial top views of the filter element part of FIG. 1 with connecting zones according to first, second and third exemplary embodiments, respectively, of the invention.
Figure 4:
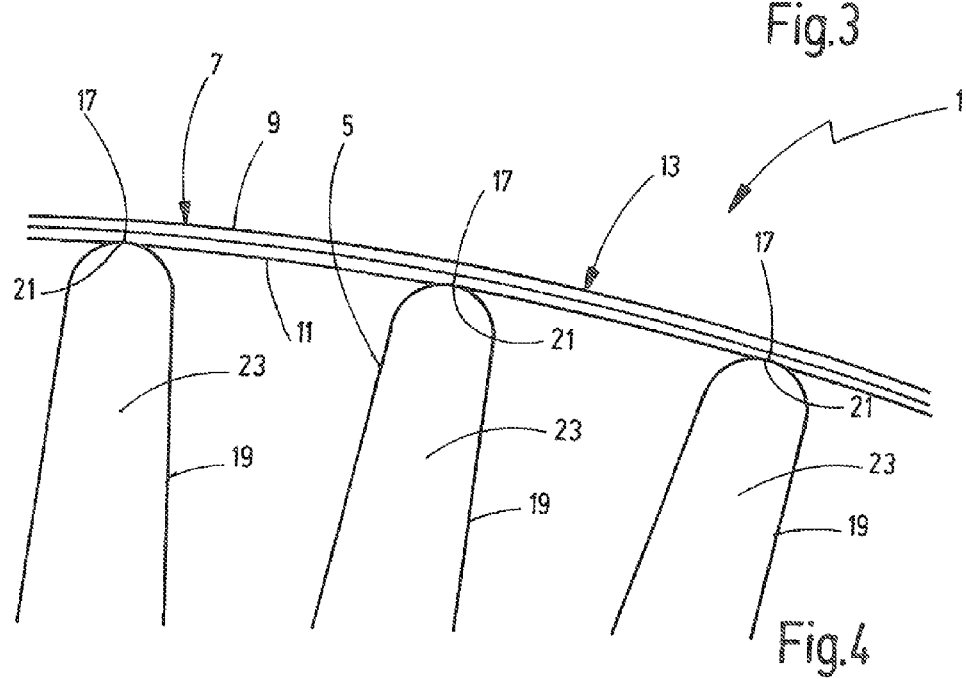

FIGS. 1 to 5 show a filter element part 1, which is produced using a method according to the invention. A pleated filter mat 5 is arranged around a central, perforated support tube 3. The filter mat 5 is enclosed on its outside by an outer envelope 13 formed of a composite 7 of layers or film webs 9, 11. The outer envelope 13 is provided throughout with perforations 15, which preferably congruently penetrate all film webs or layers 9, 11, so that the outer envelope 13 is correspondingly designed as fluid-permeable.

Furthermore, a type of neutral line for the middle of the filter folds 19 is illustrated in FIG. 1 as a middle concentric circular line 4 in relation to the longitudinal axis of the filter element part 1. To be complete, the filter element part shown in FIG. 1 would also be provided with end caps in a typical manner, to obtain an operational filter element (not shown) as a whole. If the filter mat 5, constructed from typical filtering plastic materials, also in fiber form, has an external diameter larger than the internal diameter of the outer envelope 13 enclosing it, the filter fold composite of this type may then be inserted in compressed form into the cylindrical outer jacket. With a pre-definable pre-tension, the outermost filter fold backs 21 then come into contact with the inner side of the outer envelope 13, whereby contact zones are formed. The contact zones do not necessarily have to correspond to the connecting zones according to the invention, which will be explained in greater detail below. Ideally, the outer envelope or the outer jacket is applied directly to the preinstalled filter element (filter mat 5; 31 with support tube), and is tensioned by wrapping around the filter mat, so that during the welding, a certain pre-tension of the fold backs 21 on the inner side of the outer envelope 13 is already present. An insertion of the compressed fold composite into the outer envelope 21 is then not possible as described above in this regard, since the outer envelope 13 still represents a film web at this point in time and has not yet been welded together at the web ends. The design of the weld seam of this type on the web ends laid one on top of another is implemented together with the design of the fold fixation.

In FIGS. 1 through 5, the connecting zones, which are formed according to the invention by an energy input method, are identified by 17 and 30. "Connecting zones" within the meaning of the invention are to be understood as contact points between at least parts of the filter mat 5, which face toward the outer envelope 13, and the layer composite 7 of the outer envelope 13, at which a stabilization of the relative layer relationship of the parts pressing against one another is achieved. This layer stabilization does not need to be caused by an integrally-joined bond, but rather the prevention of relative movements of the adjoining elements can be accomplished by the method according to the invention in a friction-locked, force-locked, or form-fitted manner. In the illustration of FIGS. 1 through 4, connecting zones 17 extend essentially over the entire axial length L of the filter folds 19 in the region of the fold backs 21 in contact with the outer envelope 13, which are also referred to as outer backs.

In the invention, the energy input occurs preferably in the form of a thermal input, which is generated by laser light. For the conversion of the radiation energy of a laser beam, one of the film webs 9, 11 of the composite 7 forming the outer envelope 13 is designed to be laser-absorbent. In this case, preferably a radially inward arranged film web 11 of the composite 7 of at least two film webs 9, 11 is laser-absorbent, while outer film web 9 or webs is laser-transparent. An outer film web 9 can preferably be formed from a polyamide plastic material, while the laser-absorbent inner film web 11 can contain a polyamide or polyethylene plastic material, which can be provided with additives, coated, or implemented as a multi-film web to form a laser-opaque barrier layer in a suitable manner, as already mentioned above. The heat input generated by the laser beam can be controlled in such a manner that increases in volume occur in the filter mat 5, which is of conventional plastic materials, and in the film material of the outer envelope 13. A contact pressure force is generated such that the connecting zones 17 form contact points between fold backs 21 and outer envelope 13, at which relative movements are prevented by a friction lock or force lock thus formed. Secure fold fixation is then achieved with essentially full, unobstructed through flow.

Alternatively, the laser input can be executed in the manner of a transmission welding. The filter material 23 of the filter mat 5 is typically multilayered in design. A support lattice (not shown in greater detail) is provided on the outer side, which preferably is formed of plastic and forms a drainage layer of the filter material 23, for example. During corresponding laser input, the outer support lattice of the filter material 23 is fused and welded to the inner film web 11 of the outer envelope 13. This laser transmission welding is preferably carried out in the case of material uniformity of outer support lattice of the filter material 23 and plastic material of the inner film web 11. For example, polyethylene plastic materials are provided as joint partners. The required joining force for the laser transmission welding can be generated in that the outer envelope 13, which is wrapped tightly around the filter material 23, presses still more tightly against the fold backs 21 due to the thermally caused volume increase, bridges possibly existing intermediate spaces, and exerts an additional tension on the folds 19.

To generate additional joining force, a laser device having roller optics could also be used, by which the outer envelope 13 is pressed solidly against the filter material 23 during the welding operation. The connecting zones 17 are formed in an integrally-joined manner by the laser transmission welding. Since the welded bond is only produced on the outer plastic support lattice of the filter material 23 on the respective fold back 21, no effective filter surface is lost due to adhesive beads or clusters, as is the case in the prior art solution according to EP 2 559 467 A1.

The transmission welding can be carried out using laser methods, in which the laser light can be focused within a laser-permeable plastic film for the heating operation. In such laser methods, laser-opaque or laser-absorbent layers can be omitted. In the invention, the circumference of the filter mat 5 can be welded at arbitrary intervals, wherein connecting zones are formed at different intervals depending on the size of the elements. The method according to the invention may be carried out without additional components, such as welding films or welding additives. The respective filter element remains optically the same, regardless of whether or not a fold stabilization is carried out. The laser input can be carried out in such a way that the outer side remains unchanged and, if needed, can be imprinted without difficulties.

Figure 5:
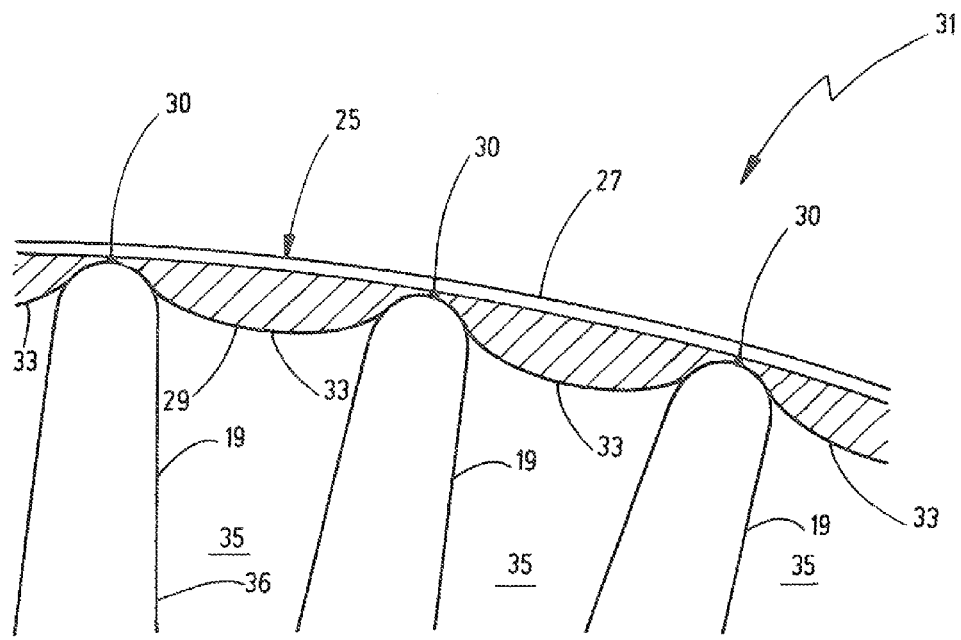

FIG. 5 illustrates a further embodiment of the method. In FIG. 5, the outer envelope 25 has an outer, laser transparent film web 27 and a laser-absorbent inner film web 29.

A state is shown in this case as it is reached after the outer envelope 25 is irradiated using laser light. In this exemplary embodiment, the inner film web 29 is provided with additives that cause foaming of the film material upon energy input, in particular laser energy input. This use of foaming additives results in the bulges 33 in FIG. 5, which bulges extend radially inwardly into the intermediate spaces 35 between successive folds 19 of the filter mat 36. By way of a type of rounded teeth thus formed, and thus a form fit, the connecting zones 30, and therefore the filter folds 19, are mechanically fixed in position at a distance from one another, without the irradiation having to be executed as transmission welding, to produce a integrally-joined bond at the connecting zones 30. In the case of the fluid permeability of the film webs 27, 29, no reduction of the full through flow whatsoever need therefore be accepted. In this embodiment as well, the laser input could be carried out as transmission welding, so that an integrally-joined bond would also be formed.

Figure 6:
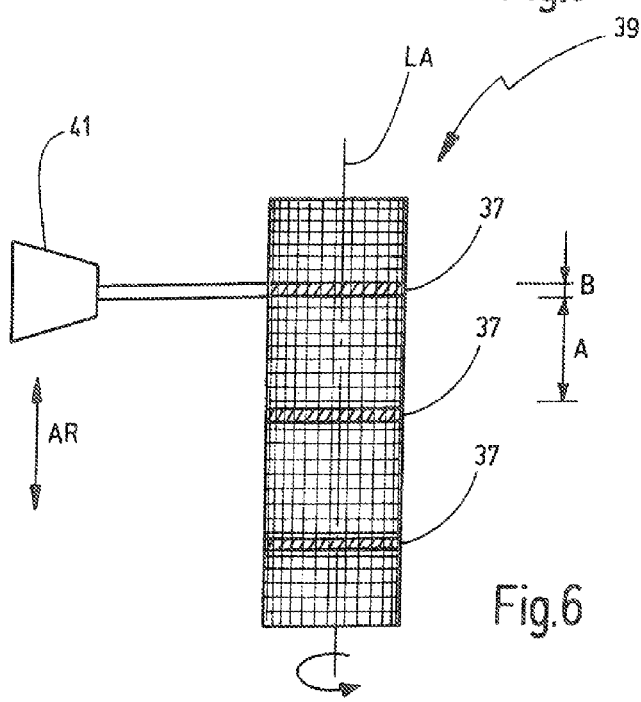

Three different possibilities for the layer arrangement of connecting zones 37 produced by laser input are illustrated in FIGS. 6 to 8. All possibilities share the feature that the filter element 39 is rotated once or multiple times about its longitudinal axis LA, while it is irradiated radially from the outside by the laser 41, which is movable only in the axial direction AR.

FIG. 6 shows how three ring-shaped connecting zones 37 are generated in the circumferential direction using the laser 41. The number of the connecting zones 37, the width B and distance A thereof, can be chosen flexibly, for example, as a function of the size of the filter element 39 and its later application. Multiple lasers 41 can also be used in parallel to accelerate the method.

In FIG. 7, only one connecting zone 37 is generated, which extends in a spiral shape with a linear path 43 around the outer side 45 of the filter element 39. The laser 41, as the energy input device, is moved in this case during the irradiation according to a movement path in the axial direction AR along the rotating filter element 39. The width B of the connecting zone, the rotational velocity of the filter element 39, and the axial advance velocity of the laser 41 are freely settable by an operator here.

Finally, FIG. 8 shows how, for example, using a bar laser 41, the filter element 39 can be irradiated along its entire axial length L, to generate a full surface fixation of the outer envelope 47 on the filter mat. The connection can be generated in this case in one revolution or in multiple revolutions of the filter element 39. Multiple lasers 41 can be arranged adjacent to one another and irradiate the filter element 39 in parallel.

Using the method according to the invention for producing a filter element 1, 31, 39, the shape of the filter mat 5; 36 can thus be stabilized, without having to provide a further element, for example, in the form of an adhesive. The fold stabilization ensures that a maximum surface area is available for the filtration. Sections of the filter mat 5, 36 cannot rest against one another, so that blockages cannot occur. In addition, the filter mat 5, 36 is protected by the outer envelope before and after the insertion into a filter. A further advantage can be seen in that the outer envelope 13, 25, 47 can protect a user from injuries since, for example, glass fiber components with sharp edges can protrude from the filter mat 5. As a result, a particularly simple and cost-effective method for producing a filter element 1, 31, 39 and a filter element 1, 31, 39 produced using this method are disclosed.

While various embodiments have been chosen to illustrate the invention, it will be understood by those skilled in the art that various changes and modifications can be made therein without departing from the scope of the invention as defined in the claims.

The invention claimed is:

1. A method for producing a filter element, comprising the steps of:
   providing a filter mat having a plurality of filter folds;
   enclosing the filter mat with a fluid-permeable outer envelope of first and second layers with the first layer being laser-transparent and with the second layer being laser-absorbent; and
   connecting the outer envelope and the filter folds in a connecting zone by applying laser radiation from an energy input device through the first layer and into the second layer to cause volume increases in the second layer such that adjacent ones of the filter folds are held in spaced positions relative to one another against collapsing on one another.

2. A method according to claim 1 wherein
   the first and second layers are film webs.

3. A method according to claim 2 wherein
   each of the film webs have perforations.

4. A method according to claim 3 wherein
   the respective perforations of the film webs are arranged congruently to one another.

5. A method according to claim 1 wherein
   the connecting zone extends essentially over an entire axial length of the filter folds as defined by a movement path of the energy input device.

6. A method according to claim 1 wherein
   the connecting zone follows a linear path as defined by a movement path of the energy input device.

7. A method according to claim 1 wherein
   the first layer comprises a polyethylene plastic film web; and
   said second layer comprises polyamide plastic film web.

8. A method according to claim 1 wherein
   the filter mat comprises multiple layers with an outer layer thereof being a support lattice of plastic.

9. A method according to claim 1 wherein
   the second layer has foam promoting additives producing a foam upon being irradiated with laser radiation.

10. A method according to claim 1 wherein
    the connecting zone is arranged along outer backs of the filter folds; and
    the outer envelope is cylindrical and applies a radial force to the filter folds.

11. A method according to claim 1 wherein
    the laser radiation produces welded connections in the connecting zone at the second layer.

12. A method according to claim 1 wherein
    the laser radiation causes the volume increases without producing welded connections between the filter folds and the second layer.

13. A method according to claim 1 wherein
    the laser radiation only produces volume increases between the filter folds and the second layer.

* * * * *